United States Patent Office 3,201,044
Patented Aug. 17, 1965

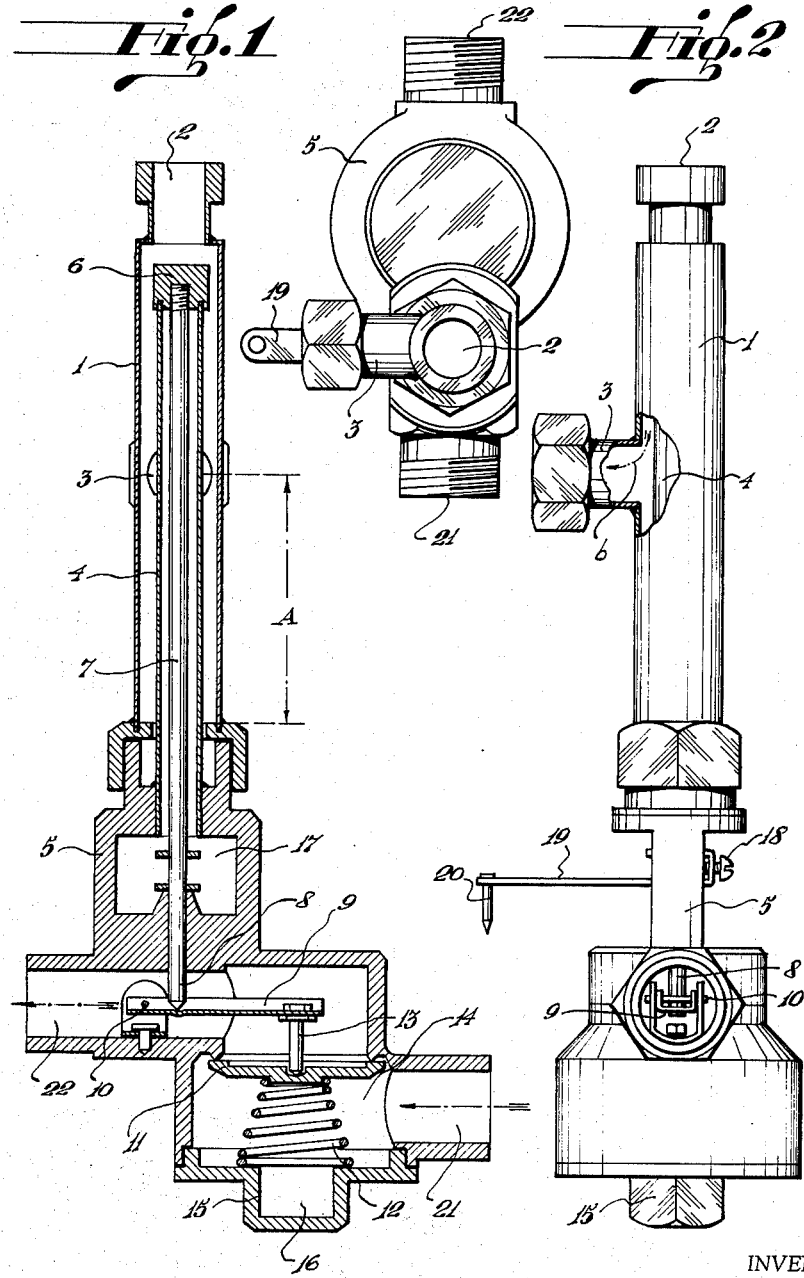

3,201,044
THERMOSTATIC VALVE
Juan Alfonso Fellner, Cordoba St. 632,
Buenos Aires, Argentina
Filed July 29, 1963, Ser. No. 298,058
1 Claim. (Cl. 236—33)

The present invention is an improvement of the thermostats in order to obtain through their incorporation in instantaneous gas water heaters a fully automatic water temperature regulation. In known devices of the kind referred to, the valve regulating and/or closing the gas passage is actuated by a thermosensitive element enclosed in a pipe in which heated water circulates, the heated water flowing through the entire length of the pipe containing the thermosensitive element entering at one end of the pipe and being discharged at the opposite end.

The variations in the temperature of the heated water act upon the thermosensitive element, causing it to expand or contract, according to the variations of the said temperature. These expansions or contractions of the thermosensitive element produce an axial displacement of a rod which is part of the element and which acts on the valve intercepting the gas passage towards the burners, shutting it completely or partially according to the employed method.

This known type of thermostat working on the principle of regulating the amount of gas supplied to the burner (not "on-off" action), is successful in a system containing enough volume of water, so that the changes in temperature are relatively slow.

However, the above mentioned regulating thermostats fail if applied to an instantaneous gas water heater.

The basic principle of an instantaneous gas water heater consists of a heat exchanger where the heat produced by a burner is transmitted to a continuous flow of water. As soon as the flow of water is stopped the heating process is also interrupted instantaneously. The instantaneous gas water heater consists of a heat exchanger where the heat produced by a burner is transmitted to a continuous flow of water. As soon as the flow of water is stopped the heating process is also interrupted instantaneously. The instantaneous gas water heater does not possess a water accumulation tank. Therefore large amounts of heat are transmitted to a very small but fast moving volume of water. Consequently the variations in water temperature are extremely abrupt, which causes uncontrollable expansions or contractions of the thermosensitive element, thus converting the regulating thermostat into an "on-off" action type. Therefore when water is drawn from the instantaneous gas water heater the "on-off" action of the thermostat produces continuous changes from hot to cold to hot and no intermediate and stable water temperature can be obtained, thus defeating the object of incorporating a thermostat into an instantaneous gas water heater.

The objects of the present invention are:
(a) To delay and control the axial displacement of the thermosensitive element caused by the abrupt changes of the water temperature, so that, instead of an "on-off" action a regulating effect can be obtained.
(b) Multiply the controlled but minute axial displacements of the thermosensitive element so that the movement given to the gas valve is sufficiently large to allow an exact regulation of the gas volume supplied to the burner in accordance with the heat required to obtain the constant preset temperature of the water.

With these objects in mind a thermostat has been devised which, apart from the conventional elements, incorporates the following two combined innovations:
(A) The thermosensitive element is encased within a pipe, which, standing upright, has a water inlet at the upper end and a water outlet at an intermediate point of its length, with the lower end closed. Due to this design a temperature compensating water chamber is formed between the water outlet and the closed end of the pipe. This compensating chamber acts as thermal brake thus preventing the thermosensitive element to respond instantaneously to the full extent of the temperature changes of the water. Therefore, after a few seconds of slight variations, the preset temperature of the water can be obtained and maintained indefinitely.

(B) The other feature of the invention consists of a lever which, being actuated by the thermosensitive element, transmits and multiplies the axial movemens of said element to the gas valve which is located at the other end of the lever. By transmitting the axial movement of the thermosensitive element through the lever to the gas valve, the latter adopts intermediate positions between closed and fully open, thus calibrating the exact gas volume to flow to the burner where, by burning these volumes of gas and transmitting the heat to the water, the desired temperature is obtained irrespective to the amount and to the inlet temperature of the water. As soon as either the amount of the water drawn from the heater or the temperature of the water entering the unit changes, the thermosensitive element senses the change, transmitting in through the lever to the gas valve, readjusting its intermediate position, maintaining thus the preset temperature of the water.

In the accompanying drawing which illustrates a preferred embodiment of the invention, FIGURE 1 represents a sectional view of the improved thermostat.

FIGURE 2 represents an exterior view of the devise, observed at right angle to that of FIGURE 1.

FIGURE 3 represents a top view of the device.

In the above mentioned drawing the reference number 1 indicates the pipe which houses the thermosensitive element with its water inlet opening 2 for the water coming from the heater and the opening 3 which indicates the outlet located at an intermediate point of the mentioned pipe at a given height A from the base. Inside the pipe 1, there is a sleeve 4 of copper or other material which reacts to temperature variations, fixed at one end to the valve casing 5 and at the other end is welded to an intermediate block 6. Into this block the threaded rod 7 is affixed.

The other end of this rod (point 8) rests on a third grade lever 9 articulated at 10. The valve 11 which regulates the gas volume, is, in its closed position held against its seat by means of the spring 12. The said valve is controlled by the bolt 13 located at the end of the lever 9. The chamber 14 which contains the valve and its spring can be opened by removing the threaded base 15, which is provided with a chamber 16 able to receive the water or any other foreign body drawn along by the gas, and which could cause disturbance in the valve or burners. A portion of the rod 7 is accessible from the exterior through the window 17. A control arm 19 extends through the window 17 and is held by a screw 18 which is connected to the rod 7. The arm 19 is provided with an indicating pointer 20, indicating the temperature on a scale. The gas enters through the conduit 21 and leaves through the conduit 22 or vice versa.

The device operates as follows:

As above described the heated water enters the thermostatic device through the inlet opening 2 filling the pipe 1. The variations in temperature of the entering water produce variations in the length of the copper sleeve 4 so that its increase or diminution in length transmitted by the rod 7 and multiplied by the lever 9, acts by means of the stem 13 to vary the degree of opening of the valve 11 and thus the volume of the gas flow passing through 22 to the burners. The following important characteristics should be noted. The heated water that enters through 2 is discharged at the intermediate point 3 as shown by the arrow $b$, inside the lower part of the pipe 1 there remains a certain quantity of static water which acts as a moderating element increasing the inertia in the expansion variations of the sleeve 4 thus avoiding the otherwise uncontrollable oscillations of valve 11. Secondly, the movement of the rod 7 is transmitted by the third grade lever 9 to the valve. The initial opening of the valve and its closing point can be correctly selected by means of the regulating arm 19 because on rotation it causes the rod 7 to screw more or less into the intermediate block 6 so that the effective length of the rod is regulated between certain limits. In order to illustrate the way the applied-for invention of the temperature compensating water chamber functions, two practical examples are given as follows, starting from the assumption that the valve opening has been stabilized in accordance with the preset output temperature for a given flow of water and a given inlet temperature:

(a) If during operation of the heater the flow of water is increased the following reactions will set in:

The temperature of the water, reaching the upper part of the thermosensitive element will decrease suddenly, but due to the still higher temperature of the water contained in the temperature compensating water chamber the reaction of the thermosensitive element will be delayed and thus will stay within controllable limits. No excessive opening of the gas valve will occur and a new balance is established maintaining the present hot water temperature.

If during operation of the heater the flow of water suddenly decreases, the events of readjustment occur in reverse order.

(b) If during operation of the heater an increase is made in the desired preset hot water temperature the following reactions will set in: By moving the indicator (19, 20) to the higher temperature, rod 7 is lowered depressing lever 9 and thus increasing the opening of valve 11. A greater volume of gas will reach the burner and the temperature of the hot water will increase. However, this sudden increase of the temperature of the water, reaching the upper part of the thermosensitive element, will not cause an excessive reaction of the thermosensitive element, due to the moderating effect of the still lower temperature of the water contained in the temperature compensating water chamber. Thus the otherwise unavoidable fluctuations in hot water temperature are prevented.

What I claim is:

An automatic temperature regulating device, comprising a vertical pipe having an upper water inlet, a valve casing supporting the lower end of said pipe, said pipe having a water outlet intermediate its upper and lower ends and substantially in the middle thereof, a thermosensitive sleeve located within said pipe and having a lower end mounted in said valve casing, whereby a temperature compensating water chamber is provided between said water outlet and the lower end of said pipe, a block carried by the other end of said sleeve, a rod having an upper end fixed to said block, a lever located within said valve casing and having a pivoted end, a bolt carried by the other end of said lever, said rod having a lower end extending into said valve casing and engaging said lever intermediate the ends of the lever, a valve disc having one side engaged by said rod, said valve casing having a gas inlet and a gas outlet, said valve disc being adapted to engage said valve casing in a closed position to separate said gas inlet from said gas outlet, said rod tending to move said valve disc into an open or intermediate position, and a spring engaging said valve disc and tending to maintain said valve disc in a closed position.

References Cited by the Examiner

UNITED STATES PATENTS

| | | | |
|---|---|---|---|
| 894,438 | 7/08 | Horner | 236—33 |
| 1,194,397 | 8/16 | Langenhein | 236—33 |
| 1,755,562 | 4/30 | Robertshaw | 236—102 |
| 1,946,679 | 2/34 | Fonseca | 236—102 |
| 2,032,447 | 3/36 | Stack | 236—20 |

EDWARD J. MICHAEL, *Primary Examiner.*